United States Patent [19]
Wheeler et al.

[11] 3,816,696
[45] June 11, 1974

[54] STRIP SHEARING AND WELDING APPARATUS

[75] Inventors: Donald J. Wheeler, Franklin, Pa.;
Victor Lohrenz, Bedford, Ohio

[73] Assignee: Guild Metal Joining Equipment Company, Bedford, Ohio

[22] Filed: Dec. 20, 1971

[21] Appl. No.: 209,606

[52] U.S. Cl. ............... 219/124, 219/107, 219/161
[51] Int. Cl. ............................................ B23k 9/12
[58] Field of Search ........... 219/124, 160, 161, 107; 83/456, 382; 29/493; 228/5, 44

[56] References Cited
UNITED STATES PATENTS

| | | | |
|---|---|---|---|
| 1,140,897 | 5/1915 | Frank | 83/694 |
| 2,911,515 | 11/1959 | Cooper | 219/161 X |
| 3,039,343 | 6/1962 | Richards | 83/622 |
| 3,378,185 | 4/1968 | Wheeler et al. | 228/5 |
| 3,399,450 | 9/1963 | Mize | 228/5 |
| 3,403,833 | 10/1968 | Wheeler et al. | 228/13 |
| 3,593,907 | 7/1971 | Hahne | 228/44 |
| 3,632,035 | 1/1972 | Wheeler | 228/5 |
| 3,645,159 | 2/1972 | Chazen | 83/599 |

FOREIGN PATENTS OR APPLICATIONS

| | | | |
|---|---|---|---|
| 1,216,073 | 11/1966 | Germany | 228/4 X |

*Primary Examiner*—C. L. Albritton
*Attorney, Agent, or Firm*—Donnelly, Maky, Renner & Otto

[57] ABSTRACT

The strip shearing apparatus includes a pair of longitudinally spaced stationary shear knives and a pair of movable shear knives carried by a pivotal support for pivotal movement between the stationary shear knives. A weld backup bar electrode may also be mounted on the pivotal support for movement into engagement with the underneath sides of the strip ends after shearing and indexing of the strip ends to the welding position to clamp the strip ends firmly in position for welding. During the welding operation, the movable shear knives on the pivotal support are desirably located above strip pass height to permit reshearing of the strips after joining if it becomes necessary to remove the weld. A pair of clamp assemblies indexable toward and away from each other between the strip shearing and welding positions continuously clamp the strips during the shearing and welding operation, and may be of generally C-shape to allow the entire apparatus to be removed from the strip processing line after the strip ends have been joined together if desired. The welding assembly may also be carried by one of the strip clamp assemblies for indexing movement therewith, and a pivotal mount may be provided for the welding assembly to protect it against damage by premature opening of the associated clamp assembly.

10 Claims, 8 Drawing Figures

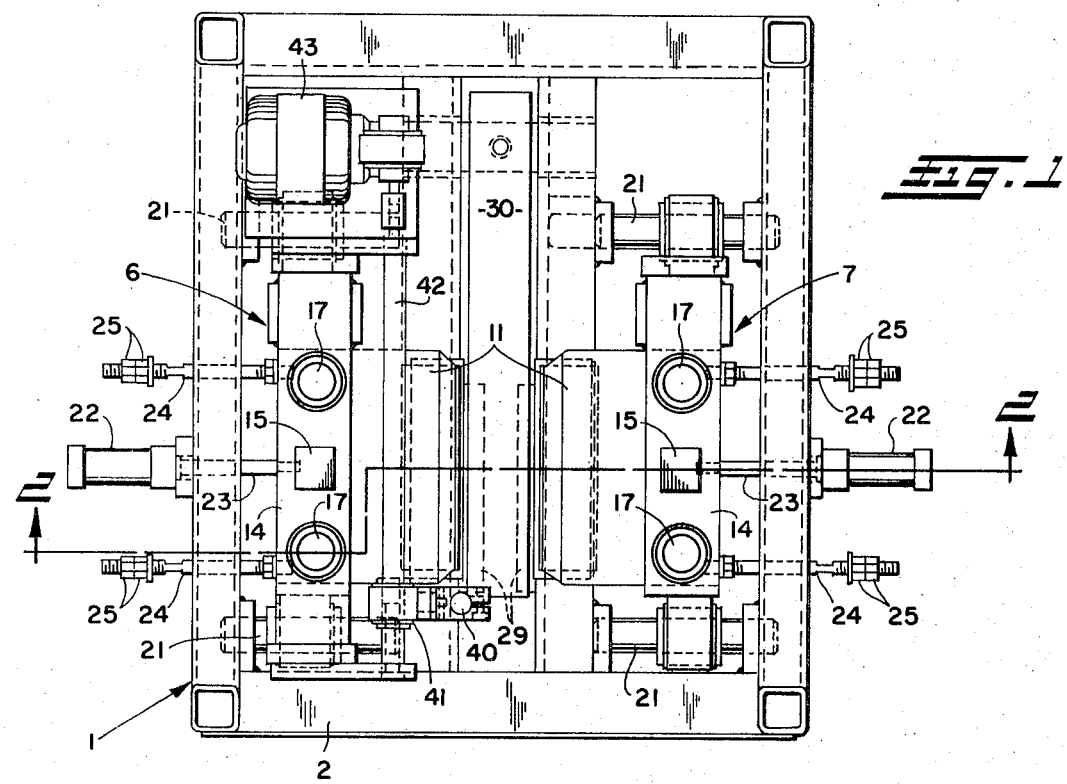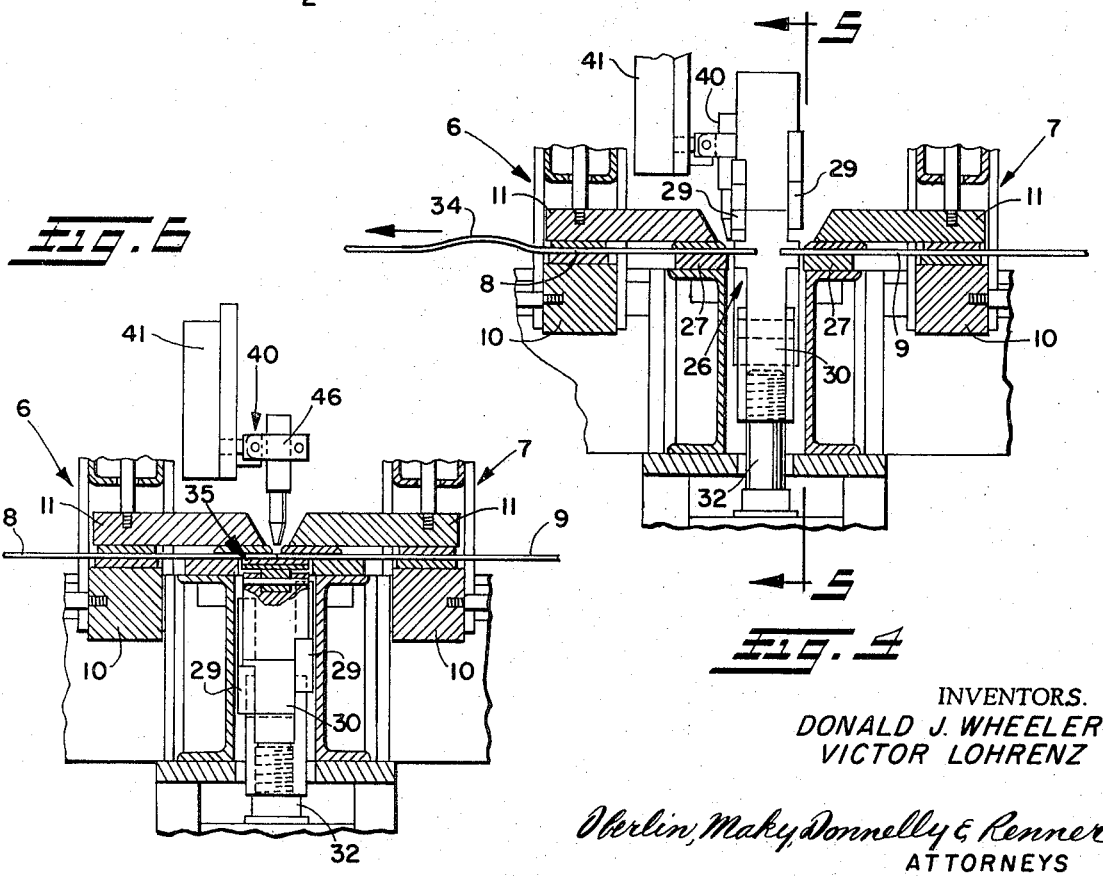

INVENTORS.
DONALD J. WHEELER
VICTOR LOHRENZ

Oberlin, Maky, Donnelly & Renner
ATTORNEYS

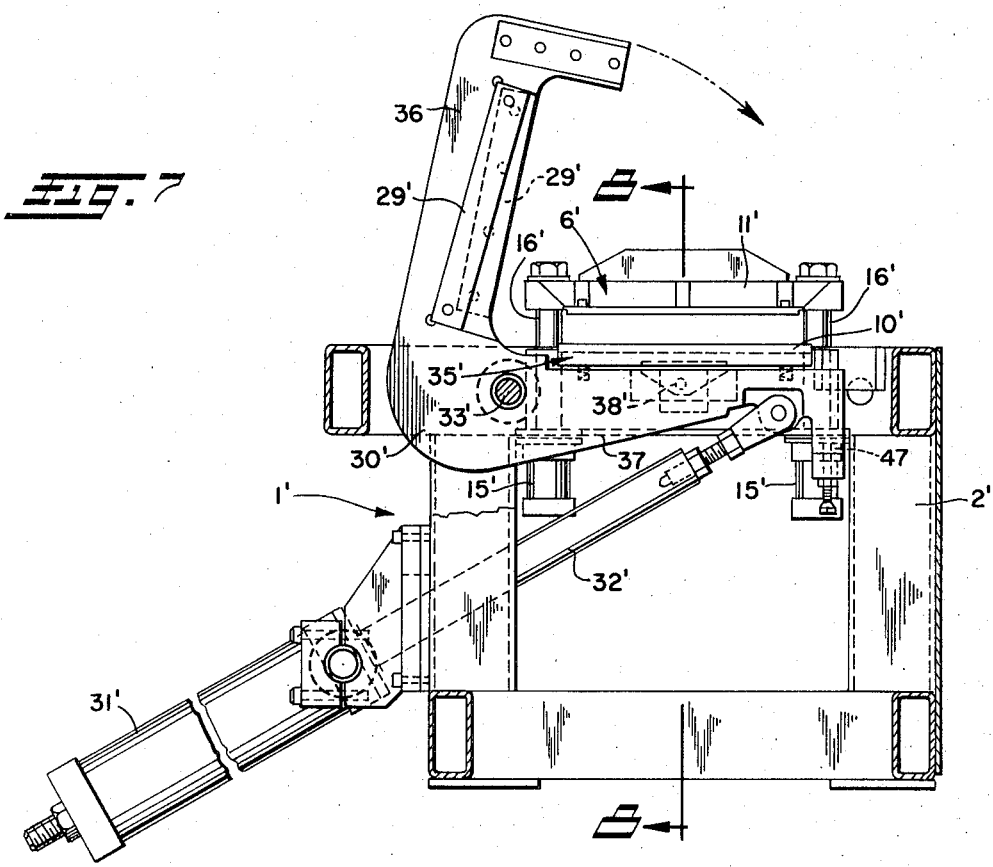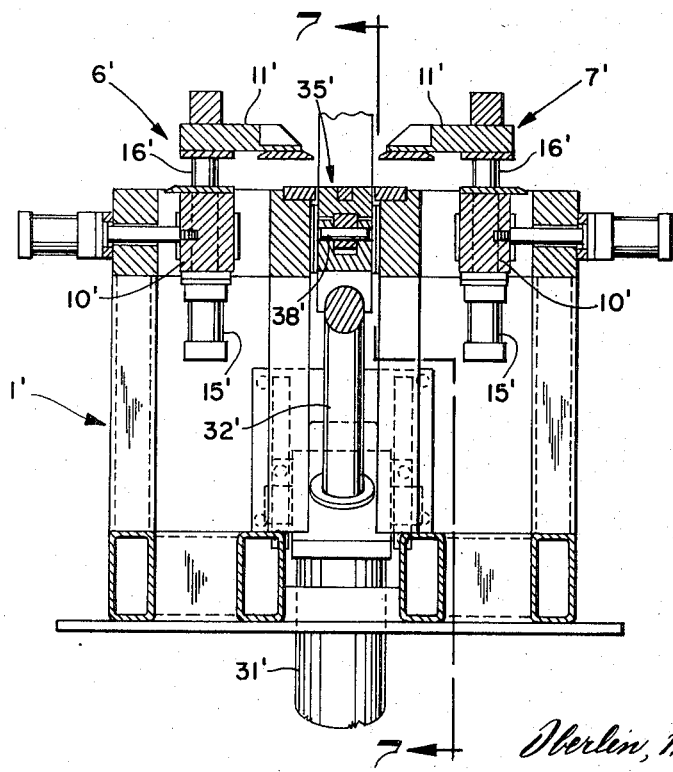

STRIP SHEARING AND WELDING APPARATUS

This invention relates generally as indicated to a strip shearing and welding apparatus which is of a relatively simple and inexpensive construction for use in shearing the ends of a pair of strips prior to joining.

The shear assembly desirably includes a pair of laterally spaced stationary shear knives and a pair of movable shear knives mounted on opposite sides of a pivotal support for pivotal movement between the stationary shear knives to shear the strip ends. The movable shear knives are desirably vertically offset to minimize power requirements during shearing.

A pair of clamp assemblies indexable toward and away from each other between the strip shearing and welding positions may be used to continuously clamp the strips during both the shearing and welding operations, thereby eliminating the possibility of strip misalignment after shearing. The clamp assemblies may be of generally C-shape to permit complete withdrawal of the entire apparatus from the strip processing line after the strip ends have been properly joined together to provide additional room and permit use of the apparatus in more than one strip processing line as desired.

The welding assembly may also be carried by one of the strip clamp assemblies for indexing movement therewith to maintain accurately the disposition of the welding assembly relative to the strip clamp assemblies when indexed to the welding position. A carriage may be provided for movement of the welding assembly out of the way, and the welding assembly may also be pivotally mounted on one of the strip clamp assemblies to protect it against damage by premature opening of the strip clamp assembly. Any contact between the vertically movable portion of the strip clamp assembly and the welding assembly will cause the welding assembly to pivot out of the way.

A weld backup bar electrode may also be provided on the pivotal support for movement into engagement with the underneath sides of the strip ends after shearing and indexing of the strip ends to the welding position to firmly clamp the strip ends in position during the welding operation. When thus positioned, the configuration of the pivotal support is desirably such that the movable shear knives on the pivotal support are located above strip pass height to permit reshearing of the strip after joining to permit removal of the weld if necessary.

Such a strip shearing and welding apparatus has the advantage that it is generally less complicated, easier to operate, requires less maintenance, and is less expensive than previous apparatus of the same general type.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a top plan view of one form of strip shearing and welding apparatus constructed in accordance with this invention;

FIGS. 4 and 6 are schematic diagrams showing progressively the various steps which are followed in the shearing and joining of strip ends using the apparatus of FIGS. 1 through 3;

FIG. 7 is a vertical transverse section through another form of apparatus constructed in accordance with this invention, taken on the plane of the line 7—7 of FIG. 8; and FIG. 8 is a fragmentary vertical longitudinal section through the apparatus of FIG. 7, taken on the plane of the line 8—8 thereof.

DESCRIPTION OF THE PREFERRED EMBODIMENT

Figure 2:
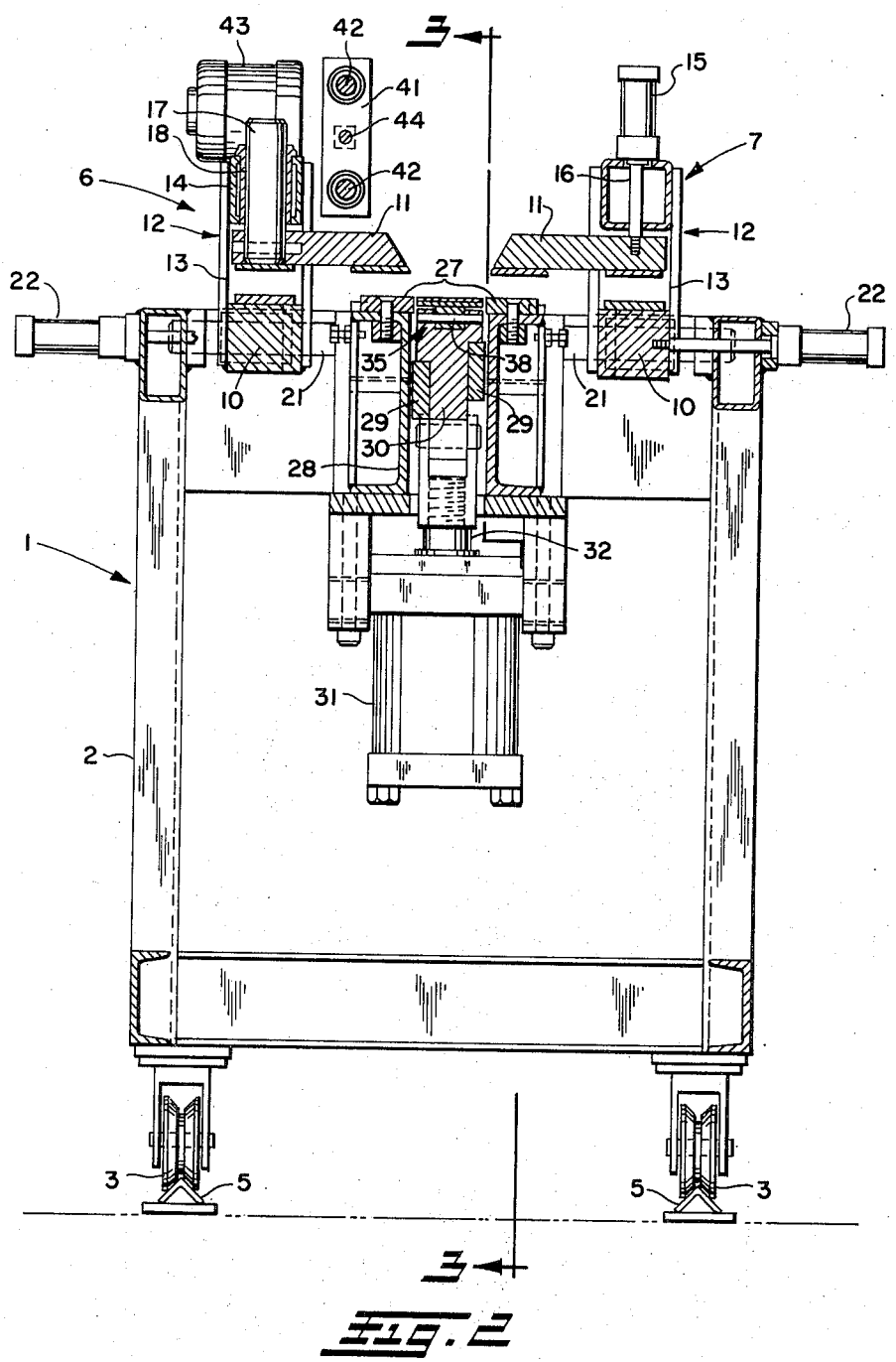
FIG. 2 is a vertical longitudinal section through the apparatus of FIG. 1, taken on the plane of the line 2—2 thereof.
Figure 3:
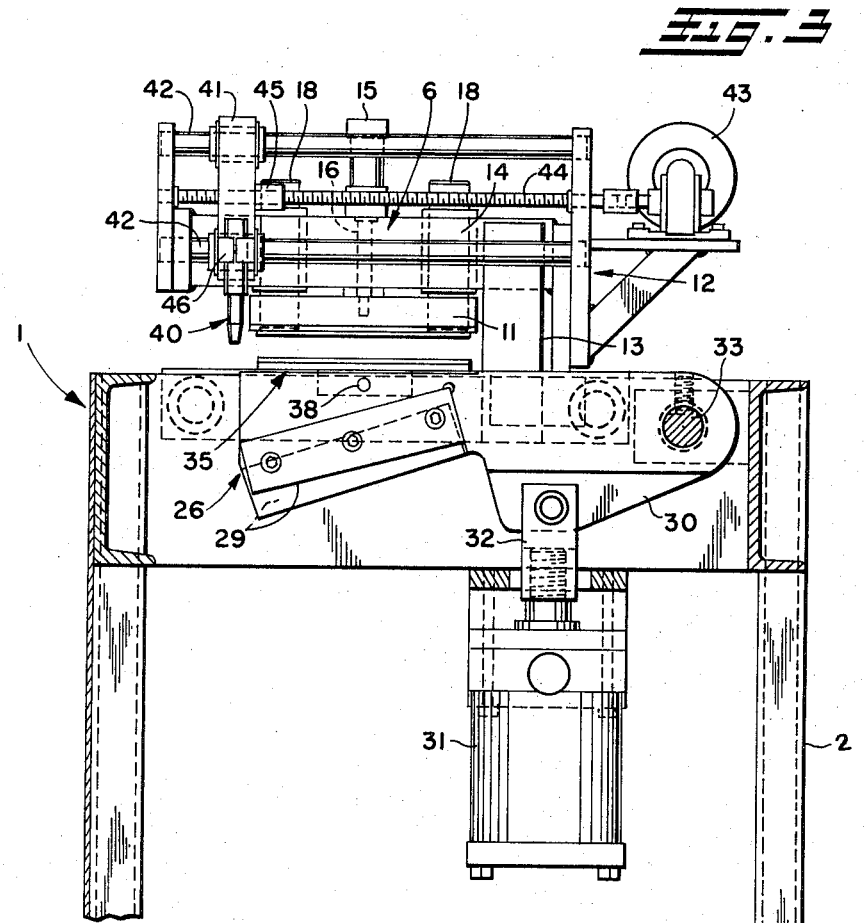
FIG. 3 is a fragmentary vertical transverse section through the apparatus of FIG. 2, taken on the plane of the line 3—3 thereof.

Referring initially to FIGS. 1 through 3, there is illustrated by way of example one form of strip shearing and welding apparatus 1 in accordance with this invention. As shown, the main frame 2 of the apparatus 1 may be mounted on wheels 3 for movement along rails 5 into and out of a continuous strip processing line.

Mounted on the main frame 2 are a pair of strip clamp assemblies 6 and 7 for firmly clamping a pair of strip ends 8 and 9 (see FIGS. 4 and 6) during both the shearing and welding operations in a manner to be fully described hereafter. Each strip clamp assembly 6, 7 may be of substantially identical construction, including a lower elongated clamp member 10 extending transversely beneath the strip material being processed and an elongated upper clamping member 11 in the form of an elongated clamping beam extending transversely across the top of the strip material.

The upper clamping member 11 of each strip clamp assembly 6, 7 is mounted for vertical movement toward and away from the associated lower clamping member 10 for clamping the respective strip ends 8 and 9 therebetween. In the FIGS. 1 through 3 embodiment, the upper clamping members 11 are supported above the respective lower clamping members 10 by generally C-shaped frame members 12 including a generally vertical frame member 13 extending upwardly from the same ends of the respective lower clamping members 10 and a generally horizontal frame member 14 extending outwardly from the vertical frame members 13 in parallel spaced relation to the lower clamping members.

Mounted on each horizontal frame member 14 intermediate the ends thereof is a fluid cylinder 15 whose rod 16 extends below the horizontal frame member and is suitably connected to the upper clamping member 11 therebeneath for raising and lowering of the upper clamping members by actuation of the associated cylinders. Suitable guide rods 17 extending upwardly from the upper clamping members 11 through bushings 18 in the horizontal frame members 14 guide the upper clamping members during such vertical movement.

Making the frame members 12 for the upper clamping members 11 of generally C-shape permits removal of the apparatus 1 from the strip processing line after completion of the welding operation to provide additional room and permit use of the apparatus in another strip processing line, as desired. However, it will be apparent that the upper clamping members 11' could also be supported from beneath the lower clamping members 10' by a pair of laterally spaced cylinders 15' mounted on the lower clamping members 10' and having their rods 16' connected to the upper clamping members as shown in FIGS. 7 and 8 for raising and lowering of the upper clamping members relative to the lower clamping members by actuation of the cylinders. Of course, such an apparatus 1' would have to remain in the processing line after welding the ends of the strips together but it would not interfere with the strip processing operations since the strip material would be free to pass through the apparatus after the strip clamp assemblies 6', 7' are opened.

The strip clamp assemblies 6, 7 may be mounted for indexing movement toward and away from each other between a shearing position shown in FIGS. 1, 2 and 4 and a welding position shown in FIG. 6 as by providing guide rods 21 extending through openings in the lower clamping members 10 intermediate the ends thereof. Movement of the clamp assemblies 6, 7 along the guide rods 21 may be effected by actuation of one or more cylinders 22 mounted on each side of the main frame 2 and having their respective rods 23 connected to the lower clamping members 10. The extent of indexing movement of the clamp assemblies toward each other may be controlled by a pair of laterally spaced gap shafts 24 extending from the lower clamping members 10 through openings in the main frame. The projecting ends of the gap shafts 24 are threaded for adjustment of a pair of nuts 25 thereon to control the gap between the strip ends when at the welding position as desired. See FIG. 1.

Also mounted on the main frame 2 inwardly of the lower clamping member 10 is a shear assembly 26 including a pair of longitudinally spaced stationary shear knives 27 supported on channel members 28 extending beneath the strip material and a pair of movable shear knives 29 mounted on opposite sides of a pivotal support 30 for pivotal movement between the stationary shear knives. The movable shear knives 29 cooperate with the stationary shear knives 27 during downward swinging movement of the movable shear knives 29 past the stationary shear knives to shear the ends of the strip material therebetween, and such movable shear knives 29 are desirably vertically offset from each other with the cutting edge of one movable shear knife disposed below the cutting edge of the other as shown in FIGS. 2–5 so that they shear at different times to minimize power requirements.

Movement of the pivotal support 30 and shear knives or blades 29 carried thereby relative to the stationary shear blades 27 may be obtained by providing a fluid cylinder 31 pivotally connected to the main frame 2 beneath the pivotal support 30 and having its rod 32 pivotally connected to the support. The pivotal axis 33 for the pivotal support 30 is desirably located on the main frame 2 below strip pass height and off to one side as shown in FIG. 3 so that when the pivotal support is raised to move the shear knives 29 carried thereby above strip pass height, the pivotal support 30 will not interfere with the placement of the strip ends 8, 9 between the shear knives or with the shearing action during downward movement of the movable shear knives 29 past the stationary shear knives 27.

Figure 5:
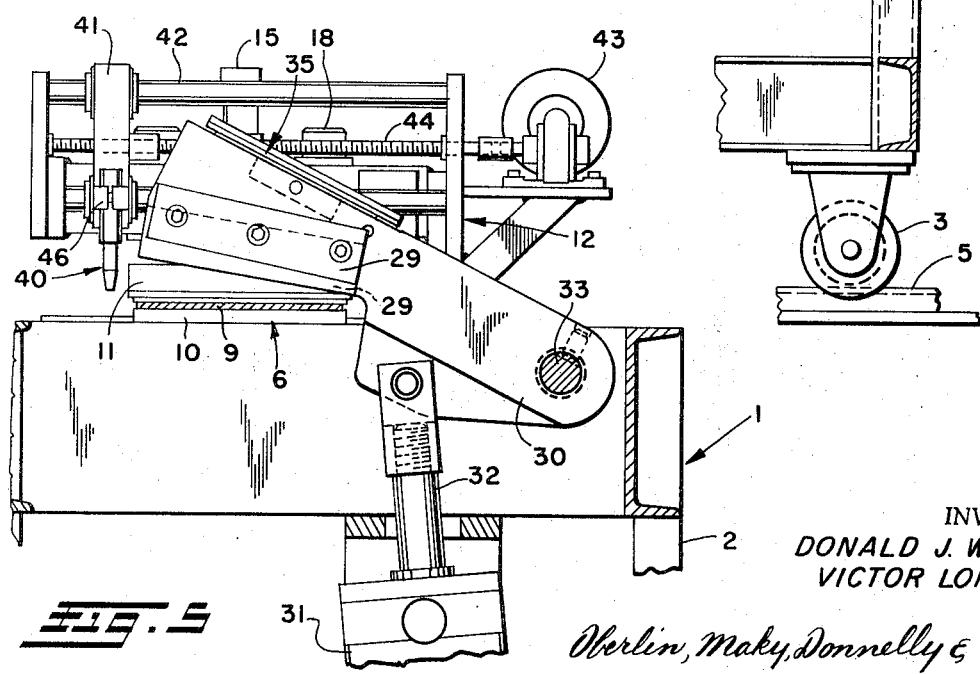
FIG. 5 is a fragmentary vertical transverse section through the schematic diagram of FIG. 4, taken on the plane 5—5 thereof.

Before shearing of the strip ends 8, 9 can be effected, the strip clamp assemblies 6, 7 must be located in the shearing position and opened as shown in FIGS. 1, 2 and 3, and the movable shear knives 29 should be raised above strip pass height as shown in FIGS. 4 and 5 so as not to interfere with proper positioning of the strip ends within the shearing apparatus. Next the strip clamp assemblies 6, 7 are closed to firmly clamp the strips 8, 9 between the lower and upper clamping members 10, 11 as shown in FIG. 4. With the clamp assemblies 6, 7 in the shear position, the upper clamping beams 11 substantially overhang their respective lower clamping members 10 and terminate just short of the cutting edges of the stationary shear knives 27 firmly pressing the strip ends against the stationary shear knives to hold the strip ends in place during downward movement of the movable shear knives past the stationary shear knives to shear the scrap material from the ends of the strips.

After the shearing operation, the strip clamp assemblies 6, 7 are indexed toward each other from the strip shearing position shown in FIG. 4 to the strip welding position shown in FIG. 6 by actuation of the fluid cylinders 22 to bring the sheared ends of the strips into proper alignment for welding with the desired gap between the ends of the strips being maintained by the gap rods 24 as aforesaid. During such indexing movement of the clamp assemblies 6, 7 toward each other, the strip ends remain clamped between the clamp assemblies to cause the strip ends to be indexed to the same extent and maintain the desired alignment between the strip ends. As the clamp assemblies 6, 7 move relative to the stationary shear knives 27, the strip ends and noses of the upper clamping beams 11 engaged thereby are caused to slide over the top of the stationary shear knives. A loop or hump 34 may be formed in the trailing end of the old strip 8 prior to the initial clamping operation as shown in FIG. 4 to provide sufficient slack for indexing of the strip from the shear position of FIG. 4 to the welding position of FIG. 6.

A weld backup bar 35 may also be provided on the pivotal support 30 for movement into engagement with the underneath sides of the strip ends after shearing and indexing of the strip ends to the welding position by actuation of the fluid cylinder 31 to firmly press the strip ends against the noses of the upper clamping beams 11 as shown in FIG. 6, thereby readying the strip ends for the welding operation. The weld backup bar 35 may be mounted on the upper surface of the pivotal support 30 as shown in the FIGS. 1 through 6 embodiment, but in that event the movable shear blades 29 are located beneath the strip material during welding which has the disadvantage that the movable shear blades 29 cannot be raised to the shearing position after welding the strip ends together for reshearing the strip material to remove the weld if necessary.

Accordingly, it is preferred that the pivotal support 30' be in the shape of a Vee with the movable shear knives 29' mounted on the upper leg 36 of the support 30' and the weld backup bar 35' mounted on the upper face of the lower leg 37 as shown in the FIGS. 7 and 8 embodiment. This permits the movable shear knives 29' to be raised above strip pass height while the weld backup bar 35' remains below strip pass height after shearing but before indexing of the sheared strip ends to the welding position. Then if it becomes necessary to remove the welded joint it merely requires moving the movable shear blades 29' downwardly past the stationary shear blades 27' as before. An adjustable stop pad 47 may be provided on the main frame 2' to limit downward movement of the movable shear knives 29' during the shearing operation.

The weld backup bar 35, 35' may be pinned at its center to the support 30, 30' by a longitudinally extending pin 38, 38' as shown.

Any suitable welding apparatus, such as a seam welding wheel, spot welding electrodes, spot stitch equipment, or flash butt welding apparatus may be used to weld the strip ends together, and the welding apparatus may also be separate from the apparatus of the present invention if desired. However, in the FIGS. 1 through 6 embodiment the welding apparatus 40 is shown mounted on one of the strip clamp assemblies 6, 7 for indexing movement therewith to maintain proper orientation of the welding apparatus 40 with respect to the inner ends of the upper clamping beams 11 when moved to the welding position.

As best seen in FIGS. 1 and 3, the welding apparatus 40 illustrated is a torch mounted on a carriage 41 for sliding movement along a pair of guide rods 42 on the horizontal frame member 14 of the strip clamp assembly 6. The weld carriage 41 may be moved back and forth along the guide rods 42 transversely across the strip material by actuation of a reversible drive motor 43 mounted at one end of the horizontal frame member. The drive motor 43 is coupled to a screw shaft 44 supported by the horizontal frame member 14 and extending parallel to the guide rods 42, such screw shaft 44 threadedly engaging a drive nut 45 on the weld carriage.

Vertical adjustment of the welding apparatus 40 may be obtained by providing a suitable adjustable clamping device 46 therefor which is also desirably pivotally mounted to the weld carriage as shown in FIG. 6 to protect the welding apparatus 40 against damage in the event that the strip clamp assembly 6 is opened prematurely without first moving the weld carriage 41 to one end of the frame member where it is out of the way. Because of the pivotal mount for the welding apparatus 40, if the upper clamping beam 11 engages the welding apparatus during opening of the strip clamp assembly 6, the welding apparatus will simply pivot out of the way.

With the strip ends 8, 9 in the welding position and the weld backup bar electrode 35 or 35' firmly pressing the ends of the strips against the noses of the upper clamping beams 11 or 11', the strip ends may be welded together in known manner. After completion of the welding operation, the strip clamp assemblies 6, 7 or 6', 7' may be opened and indexed back to the shearing position to permit inspection of the weld.

If for one reason or another the weld is bad, the strips may be reclamped and the weld removed when using the apparatus 1' of the FIGS. 7 and 8 embodiment by causing the movable shear knives 29' which are already located above the joined strips to shear through the joined strips on opposite sides of the weld. Then the sheared strip ends are again indexed to the weld position and rewelded as previously described.

When the operator is satisfied with the weld, the apparatus 1 if constructed in accordance with the FIGS. 1 through 6 embodiment, may either be left in place with the strip clamp assemblies 6, 7 open to permit continued movement of the strip material through the strip processing equipment in the line, or withdrawn from the strip processing line which is permitted because of the C-shape configuration of the clamp assembly frames 12 to provide additional room in the line and also permit use of the apparatus in another line as desired.

From the foregoing, it can now be seen that the strip shearing apparatus of the present invention is of a relatively simple construction which requires little maintenance, is easy to operate, and is less expensive than previous apparatus of the same general type. The pivotal mount for the movable shear knives provides a very simple and effective way of controlling the movements thereof, and also permits the same device to be used for supporting the weld backup bar electrode.

The unique configuration of the pivotal support for the movable shear knives of the FIGS. 7 and 8 embodiment also permits the movable shear knives to be positioned above the strips during the welding operation to facilitate ready removal of the weld if necessary, and vertically staggering the movable shear knives minimizes power requirements during the shearing operation.

The embodiments of the invention in which an exclusive property or privilege is claimed are defined as follows:

1. Strip shearing and welding apparatus comprising a main frame, a pair of spaced apart stationary elongated shear knives fixed to said main frame, a pivotal support, means mounting said pivotal support on said main frame for pivotal movement between said stationary shear knives, a pair of movable shear knives mounted on opposite sides of said pivotal support for movement therewith and having a spacing substantially equal to the spacing between said stationary shear knives for shearing material disposed between said movable and stationary shear knives during movement of said movable shear knives past said stationary shear knives, pivoting means for pivoting said support, a pair of strip clamp assemblies, means mounting said strip clamp assemblies for indexing movement toward each other from a strip shearing position to a strip welding position and return, said strip clamp assemblies including a lower clamping member and an upper clamping beam, and means mounting said upper clamping beam for vertical movement toward and away from said lower clamping member for respectively clamping and releasing a strip disposed therebetween, a weld backup bar carried by said pivotal support, said upper clamping beam substantially overhanging said lower clamping member and movable toward said lower clamping member for clamping a strip both against the lower clamping member and upper surface of said stationary shear knives when said strip clamp assemblies are in the shearing position and clamping the strip against both the lower clamping member and the upper surface of said weld backup bar when said strip clamp assemblies are in the welding position, and means for welding the ends of two strips together when clamped by said strip clamp assemblies in the strip welding position, said main frame including a generally C-shape frame having a generally vertical frame member extending upwardly from the same ends of each of said lower clamping members and a generally horizontal frame member extending outwardly from each of said vertical frame members in parallel spaced relation to said lower clamping members, and means mounting said upper clamping beams on said horizontal frame members in vertically spaced relation above said lower clamping members for movement toward and away from said lower clamping members, said C-shape frames being open on the same side to permit withdrawal of said apparatus from a strip processing line after welding a pair of strips together.

2. Strip shearing and welding apparatus comprising a main frame, a pair of spaced apart stationary elongated shear knives fixed to said main frame, a pivotal support, means mounting said pivotal support on said main frame for pivotal movement between said stationary shear knives, a pair of movable shear knives mounted on opposite sides of said pivotal support for movement therewith and having a spacing substantially equal to the spacing between said stationary shear knives for shearing strip material disposed between said movable and stationary shear knives during movement of said movable shear knives past said stationary shear knives, pivoting means for pivoting said support, a pair of strip clamp assemblies, means mounting said strip clamp assemblies for indexing movement toward each other from a strip shearing position to a strip welding position and return, said strip clamp assemblies including a lower clamping member and an upper clamping beam, and means mounting said upper clamping beam for vertical movement toward and away from said lower clamping member for respectively clamping and releasing a strip disposed therebetween, and a carriage mounted on one of said strip clamp assemblies for indexing movement therewith between such shearing and welding positions, means mounting said carriage on said one strip clamp assembly for transverse movement of said carriage relative to said one strip clamp assembly, and a welding apparatus mounted on said carriage for welding the ends of two strips together during such transverse movement with said strip clamp assemblies in the welding position, said upper clamping beam of said one strip clamp assembly being vertically movable relative to said welding apparatus, and means mounting said welding apparatus for upward pivotal movement on said carriage upon contact by said upper clamping beam of said one strip clamp assembly during vertical movement of said upper clamping beam away from said lower clamping member to protect said welding apparatus against damage by premature opening of said one strip clamp assembly.

3. The apparatus of claim 2 further comprising weld backup bar means carried by said pivotal support, said pivotal support being movable by said pivoting means to position said weld backup bar means between said stationary shear knives with said weld backup bar means at strip pass height for supporting the under side of strip material during welding, said weld backup bar means being pinned at its center to said pivotal support.

4. The apparatus of claim 2 wherein said means for pivoting said support comprises a fluid cylinder pivotally mounted to said main frame below strip pass height, said cylinder having a rod extending therefrom and pivotally connected to said support, and adjustable stop pad means on said main frame to limit the downward movement of said pivotal support during the shearing operation.

5. Strip shearing and welding apparatus comprising a main frame, a pair of spaced apart stationary elongated shear knives fixed to said main frame, a pair of movable shear knives, means mounting said movable shear knives on said main frame for movement between said stationary shear knives, said movable shear knives having a spacing substantially equal to the spacing between said stationary shear knives for shearing strip material disposed between said movable and stationary shear knives during movement of said movable shear knives past said stationary shear knives, a pair of strip clamp assemblies, means mounting said strip clamp assemblies for indexing movement toward each other from a strip shearing position to a strip welding position and return, said strip clamp assemblies including a lower clamping member and an upper clamping beam, and means mounting said upper clamping beam for vertical movement toward and away from said lower clamping member for respectively clamping and releasing a strip disposed therebetween, and a carriage mounted on one of said strip clamp assemblies for indexing movement therewith between such shearing and welding positions, means mounting said carriage on said one strip clamp assembly for transverse movement of said carriage relative to said one strip clamp assembly, and a welding apparatus mounted on said carriage for welding the ends of two strips together during such transverse movement with said strip clamp assemblies in the welding position, said upper clamping beam of said one strip clamp assembly being vertically movable relative to said welding apparatus, and means mounting said welding apparatus for upward pivotal movement on said carriage upon contact by said upper clamping beam of said one strip clamp assembly during vertical movement of said upper clamping beam away from said lower clamping member to protect said welding apparatus against damage by premature opening of said one strip clamp assembly.

6. The apparatus of claim 5 further comprising a pair of gap rods extending from said lower clamping members through openings in said main frame, the projecting ends of said gap rods being threaded for threaded engagement by nuts which may be adjusted to control the extent of inward movement of said strip clamp assemblies from the shearing position to the welding position for controlling the gap between the strip ends at the welding position, said nuts engaging said main frame during such inward movement of said strip clamp assemblies to prevent further inward movement.

7. The apparatus of claim 5 wherein said movable shear knives include cutting edges which are vertically staggered with the cutting edge of one of said movable shear knives disposed below the cutting edge of the other movable shear knife so that said movable shear knives shear at different times during movement past said stationary shear knives to minimize power requirements during shearing.

8. Apparatus for use in shearing the ends of a pair of strips prior to joining comprising a main frame, a pair of spaced apart stationary elongated shear knives fixed to said main frame, a pivotal support, means mounting said pivotal support on said main frame for pivotal movement between said stationary shear knives, a pair of movable shear knives mounted on opposite sides of said pivotal support for movement therewith and having a spacing substantially equal to the spacing between said stationary shear knives for shearing strip material disposed between said movable and stationary shear knives during movement of said movable shear knives past said stationary shear knives, pivoting means for pivoting said support, and weld backup bar means carried by said pivotal support, said pivotal support being movable by said pivoting means to position said weld backup bar means between said stationary shear knives with said weld backup bar means at strip pass height for supporting the under side of strip material during welding, said pivotal support including upper and lower legs, said movable shear knives being mounted on said upper leg and said weld backup bar means being mounted on said lower leg in vertical spaced relation below said movable shear knives, whereby when said weld backup bar means is in position at strip pass height for supporting the under side of the strip material, said movable shear knives are above strip pass height to permit reshearing of the strip material after welding as desired.

9. The apparatus of claim 8 wherein said movable shear knives include cutting edges which are vertically staggered with the cutting edge of one of said movable shear knives disposed below the cutting edge of the other movable shear knife so that said movable shear knives shear at different times during movement past said stationary shear knives to minimize power requirements during shearing.

10. The apparatus of claim 8 wherein said pivotal support is in the shape of a Vee including said upper and lower legs.

* * * * *